(12) United States Patent
Mohammed et al.

(10) Patent No.: US 12,273,374 B2
(45) Date of Patent: Apr. 8, 2025

(54) MALWARE DETECTION USING FREQUENCY DOMAIN-BASED IMAGE VISUALIZATION AND DEEP LEARNING

(71) Applicant: Mayachitra, Inc., Santa Barbara, CA (US)

(72) Inventors: Tajuddin Manhar Mohammed, Goleta, CA (US); Lakshmanan Nataraj, Chennai (IN); Bangalore S. Manjunath, Santa Barbara, CA (US); Shivkumar Chandrasekaran, Santa Barbara, CA (US)

(73) Assignee: Mayachitra, Inc., Santa Barbara, CA (US)

( * ) Notice: Subject to any disclaimer, the term of this patent is extended or adjusted under 35 U.S.C. 154(b) by 1051 days.

(21) Appl. No.: 17/211,019

(22) Filed: Mar. 24, 2021

(65) Prior Publication Data

US 2022/0311782 A1 Sep. 29, 2022

(51) Int. Cl.
*H04L 9/40* (2022.01)
*G06F 18/24* (2023.01)
*H04L 41/16* (2022.01)

(52) U.S. Cl.
CPC ............ *H04L 63/145* (2013.01); *G06F 18/24* (2023.01); *H04L 41/16* (2013.01)

(58) Field of Classification Search
CPC ....... H04L 63/145; H04L 41/16; H04L 41/14; H04L 43/08; H04L 41/22; G06F 18/24; G06F 18/2115; G06F 21/564; G06V 10/431; G06V 10/454; G06V 10/771; G06V 10/82

USPC ........................................................ 382/191
See application file for complete search history.

(56) References Cited

U.S. PATENT DOCUMENTS

| | | | | |
|---|---|---|---|---|
| 9,317,498 | B2* | 4/2016 | Baker | G06F 40/143 |
| 9,836,671 | B2* | 12/2017 | Gao | G06F 18/22 |
| 10,430,649 | B2* | 10/2019 | Pao | G06V 30/413 |
| 10,467,261 | B1* | 11/2019 | Doyle | G06F 16/248 |
| 10,565,222 | B2* | 2/2020 | Murray | G06F 16/2456 |
| 10,847,138 | B2* | 11/2020 | Ward | G10L 15/16 |
| 11,210,554 | B2* | 12/2021 | Dutta | G06V 10/993 |

(Continued)

FOREIGN PATENT DOCUMENTS

| | | | | |
|---|---|---|---|---|
| CA | 2807408 A1 * | 2/2012 | | A61B 5/0013 |
| CA | 3040165 A1 * | 5/2018 | | G06F 40/30 |

(Continued)

OTHER PUBLICATIONS

Mohammed, Tajuddin Manhar, "Malware Detection Using Frequency Domain-Based Image Visualization and Deep Learning", arXiv:2101.10578, (2021), 10 pgs.

*Primary Examiner* — Mahendra R Patel
(74) *Attorney, Agent, or Firm* — Schwegman Lundberg & Woessner, P.A.

(57) ABSTRACT

Systems and methods herein describe a malware visualization system that is configured to access a computer file, generate a first image of the computer file, determine a frequency count of bi-grams in the computer file, compute a discrete cosine transform (DCT) of the frequency count of bi-grams, generate a second image of the computer file based on the DCT of the frequency count of bi-grams, analyze the first image and the second image using an image classification neural network and generate a classification of the computer file.

20 Claims, 7 Drawing Sheets

(56) References Cited

U.S. PATENT DOCUMENTS

| | | | |
|---|---|---|---|
| 11,436,429 B2* | 9/2022 | Jaganathan | G06V 10/751 |
| 2015/0339570 A1* | 11/2015 | Scheffler | G06N 3/04 |
| | | | 706/27 |
| 2018/0027003 A1* | 1/2018 | Bahgat Shehata | G06F 21/564 |
| | | | 726/23 |
| 2018/0165554 A1* | 6/2018 | Zhang | G06N 3/045 |
| 2019/0132334 A1* | 5/2019 | Johns | G06F 21/562 |
| 2019/0354682 A1* | 11/2019 | Finkelshtein | G06F 21/564 |
| 2020/0327225 A1* | 10/2020 | Nguyen | G06N 3/084 |
| 2020/0364338 A1* | 11/2020 | Ducau | G06F 21/564 |
| 2021/0216928 A1* | 7/2021 | O'Toole | G06F 16/29 |

FOREIGN PATENT DOCUMENTS

| | | | | |
|---|---|---|---|---|
| CA | 3137338 A1 * | 11/2020 | | G06F 21/31 |
| CN | 110084737 A * | 8/2019 | | G06T 1/0021 |
| WO | WO-2007009009 A2 * | 1/2007 | | G06F 21/552 |
| WO | WO-2008123969 A1 * | 10/2008 | | G06K 9/6231 |
| WO | WO-2016081346 A1 * | 5/2016 | | G06N 20/00 |

* cited by examiner

MALWARE DETECTION USING FREQUENCY DOMAIN-BASED IMAGE VISUALIZATION AND DEEP LEARNING

This invention was made with Government support under Contract Number N68335-17-C-0048 awarded by The Office of Naval Research. The Government has certain rights in this invention.

TECHNICAL FIELD

Embodiments herein generally relate to malware detection. More specifically, but not by way of limitation, systems and methods herein describe malware detection using frequency domain-based image visualization and deep learning.

BACKGROUND

Malicious applications and software (malware) are significant security threats on the Internet today. Malware is any software that is designed to cause damage to a computer, server, network, mobile phones and other devices. Based on their specific function, malware can be classified into different types. Malware can further be classified into families which in turn have many variants that perform almost the same function. Malware variants are created either by making changes to the malware code or by using executable packers.

Malware classification deals with identifying the family of an unknown malware variant from a malware dataset that is divided into many families. The level of risk of a particular malware is determined by its function, which is in turn reflected in its family. Hence, identifying the malware family of an unknown malware is crucial in understanding and preventing new malware. In malware detection the objective is to determine if an unknown computer file is malicious, benign or unknown.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
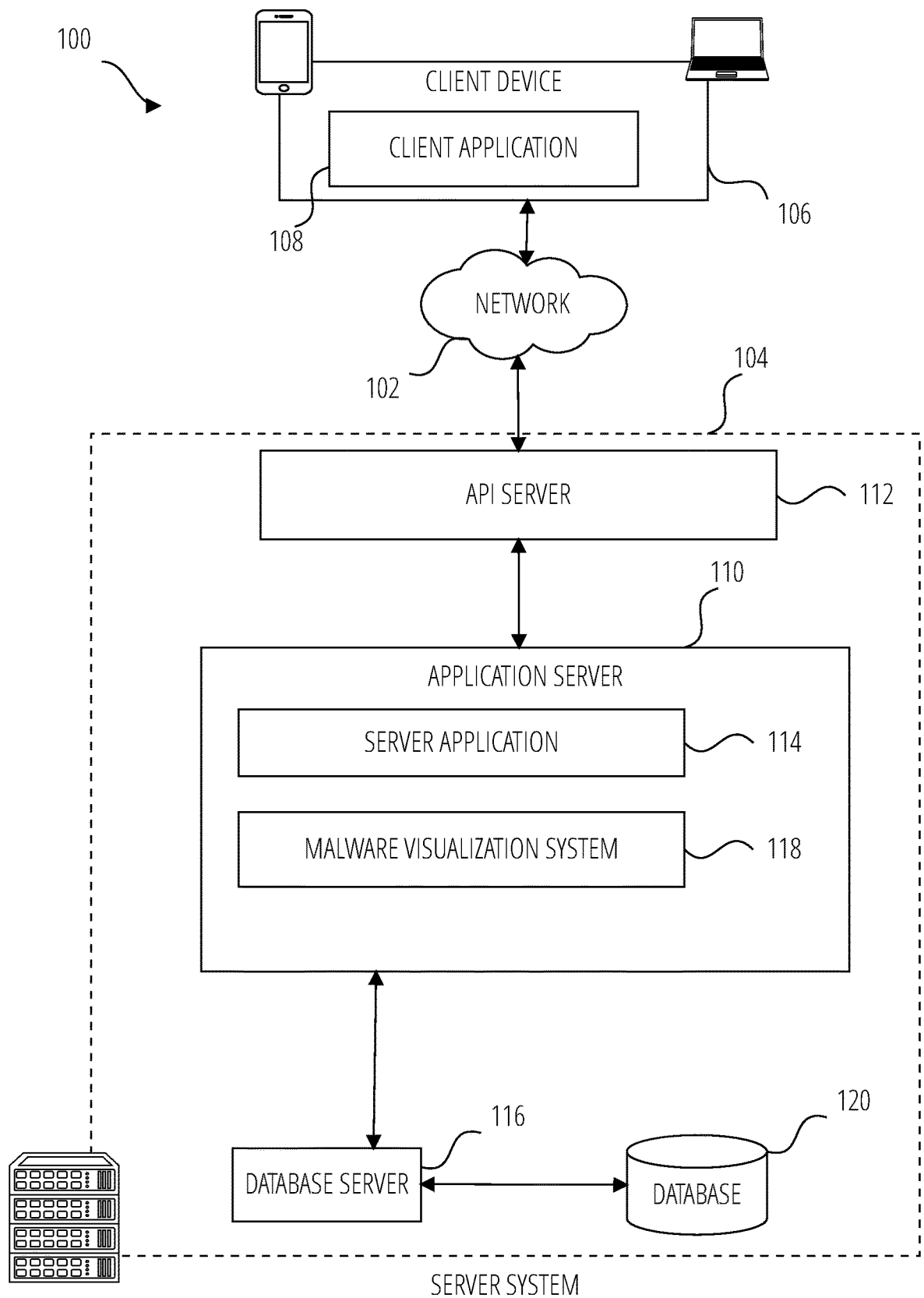
FIG. 1 is a block diagram showing an example system for exchanging data (e.g., computer files and associated content) over a network, according to some example embodiments.

Embodiments herein describe systems and methods for detecting and visualizing malware through image classification. Malware variants belonging to the same malware family exhibit visual similarity in byteplot images. The similarity is based on visualization in a spatial domain that is determined by converting bytes in a malware binary to pixels of an image. Malware can be visualized in a frequency domain to detect malware. Sparse feature representations of malware that are typically extracted from raw bytes of the binaries or disassembled instructions (e.g., n-grams, n-perms and the like) may be used to visualize malware in the frequency domain.

Given a computer file, a malware visualization system generates a first image and a second image using the computer file. In some examples, the computer file is an executable file. An executable file, also referred to herein as a binary file, is a file that causes a computer to perform operations according to encoded instructions. The instructions may refer to machine code instructions for a processor. The instructions may also refer to scripting instructions contained in a file. It is to be understood that an executable file may contain any other suitable type of computer instructions.

In some embodiments, the computer file is a data file. A data is a file that contains data used by a computer application. In some examples, a data file may contain instructions or code that causes the computer to perform operations based on the instructions.

The malware visualization system generates a first image and a second image using the computer file. The first image is a byteplot image that is generated by converting the computer file (e.g., a binary file) into an image. The second image is a bigram-DCT image. A bi-gram is an n-gram of n=2. For example, the bi-gram is a sequence of two adjacent elements from a string. The malware visualization system applies a Discrete Cosine Transform (DCT) on the frequency-count of the bi-grams to generate the second image. The DCT expresses data points in terms of a sum of cosine functions oscillating at different frequencies.

In some embodiments, the malware visualization system generates a third image, where the third image is a bi-gram image. The bi-gram image is generated based on a frequency-count of bi-grams in the computer file. The bi-gram image has dimensions 256×256 (there are 65,356 bi-grams from 0000 to ffff), where each pixel intensity value corresponds to a normalized frequency count of a particular bi-gram. For example, the first pixel intensity value in the bi-gram image corresponds to the number of times the bi-gram 0000 appears in the computer file. The second pixel intensity value corresponds to the number of times the bi-gram 0001 appears in the computer file. Similarly, the last pixel intensity value corresponds to the number of times the bi-gram ffff appears in the computer file. The bi-gram image has a few pixel intensity values that are non-zero and many which are strictly zero. The black regions in the bi-gram image (e.g., regions in which the pixel intensity value is zero) correspond to a zero-count of that particular bi-gram.

The malware visualization system uses a neural network trained for image classification to analyze the first image and the second image. For example, the malware visualization system concatenates features of the first image and the second image to determine if the computer file is malware, benign or unknown. In some examples, the malware visualization system further analyzes the third image and concatenates the features of the first, second and third images to determine if the computer file is malware, benign or unknown.

The malware visualization system accesses the computer file via a network. For example, a client device uploads the computer file to the malware visualization system via the network. The malware visualization system generates the first image and the second image using the computer file and causes display of the first image and the second image on a graphical user interface of the client device. In response to generating a classification of the computer file using the neural network trained for image classification, the malware visualization system causes display of the classification on the graphical user interface. In some examples, the malware visualization system uses the first image or the second image to search a database of images and determines if the uploaded computer file is malware, benign, or unknown. For example, the malware visualization system perform a nearest neighbor search using the first image, the second image, third image or a combination of the images to determine if the uploaded computer file is malware, benign or unknown.

FIG. 1 is a block diagram showing an example system 100 for exchanging data (e.g., messages and associated content) over a network. The system 100 includes multiple instances of a client device 106, each of which hosts a number of applications including a client application 108. Each client application 108 is communicatively coupled to other instances of the client application 108 and a server system 104 via a network 102 (e.g., the Internet).

A client application 108 is able to communicate and exchange data with another client application 108 and with the server system 104 via the network 102. The data exchanged between client application 108, and between a client application 108 and the server system 104, includes functions (e.g., commands to invoke functions) as well as payload data (e.g., text, audio, video or other multimedia data).

The server system 104 provides server-side functionality via the network 102 to a particular client application 108. While certain functions of the system 100 are described herein as being performed by either a client application 108 or by the server system 104, the location of certain functionality either within the client application 108 or the server system 104 is a design choice. For example, it may be technically preferable to initially deploy certain technology and functionality within the server system 104, but to later migrate this technology and functionality to the client application 108 where a client device 106 has a sufficient processing capacity.

The server system 104 supports various services and operations that are provided to the client application 108. Such operations include transmitting data to, receiving data from, and processing data generated by the client application 108. This data may include, message content, client device information, geolocation information, as examples. Data exchanges within the system 100 are invoked and controlled through functions available via user interfaces (UIs) of the client application 108.

Turning now specifically to the server system 104, an Application Program Interface (API) server 112 is coupled to, and provides a programmatic interface to, an application server 110. The application server 110 is communicatively coupled to a database server 116, which facilitates access to a database 120 in which is stored data associated with messages processed by the application server 110.

The Application Program Interface (API) server 112 receives and transmits message data (e.g., commands and message payloads) between the client device 106 and the application server 110. Specifically, the Application Program Interface (API) server 112 provides a set of interfaces (e.g., routines and protocols) that can be called or queried by the client application 108 in order to invoke functionality of the application server 110. The Application Program Interface (API) server 112 exposes various functions supported by the application server 110.

The application server 110 hosts a number of applications and subsystems, including a server application 114, and a malware visualization system 118.

The server application 114 implements a number of data processing technologies and functions. Other processor and memory intensive processing of data may also be performed server-side by the server application 114, in view of the hardware requirements for such processing.

The malware visualization system 118 supports various data processing services, and makes these functions and services available to the server application 114. The malware visualization system 118 accesses and analyzes a computer file and generates a determination of whether the computer file is malware, benign or unknown. The malware visualization system 118 generates a first image (e.g., a byteplot image) and a second image (e.g., a bigram DCT image) based on the computer file. The malware visualization system 118 uses an image classification neural network to analyze the first image and the second image. Based on the analysis, the malware visualization system 118 generates a determination if the computer file is malware, benign or unknown.

The application server 110 is communicatively coupled to a database server 116, which facilitates access to a database 120 in which is stored data associated with messages processed by the server application 114.

Figure 2:
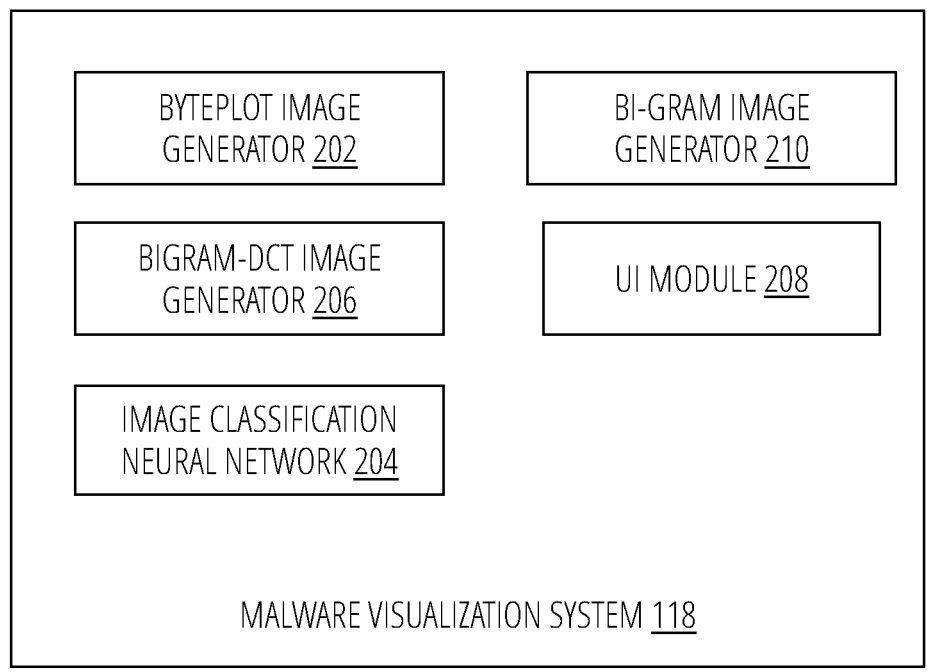
FIG. 2 is a block diagram of a malware visualization system, according to example embodiments.

FIG. 2 is a block diagram of a malware visualization system 118, according to example embodiments. The malware visualization system 118 is shown to include a byteplot image generator 202, a bigram-DCT image generator 206, an image classification neural network 204 and a UI module 208.

The byteplot image generator 202 generates a byteplot representation of the computer file (e.g., a binary file, executable file). The byteplot image generator 202 represents the computer file as a grayscale images, where each byte corresponds to one image pixel color rendered as a grayscale. For example, a pixel value of zero is represented by the color black, a pixel value of 255 is represented by the color white and all other values are intermediate shades of gray. The visual analysis of binary data represented as a grayscale image helps distinguish structurally different regions of data.

The byteplot image generator 202 receives the computer file and reads the file as a vector of 8-bit unsigned integers. The byteplot image generator 202 organizes the 8-bit unsigned integers into a 2D array. The 2D array is visualized as a grayscale image in the range of pixel values 0 to 255. The width of the image is fixed and the height of the image varies based on the malware binary file size.

The bigram-DCT image generator 206 receives the computer file and converts the computer file into a 16-bit hexadecimal vector. The 16-bit hexadecimal vector is divided into corresponding bi-grams (e.g., n-grams of bytes with n=2). An n-gram is a contiguous sequences of n items from a dataset. For example, for the byte stream: 0a1bc48a, the bigram-DCT image generator 206 divides the stream into corresponding bi-grams: 0a1b, 1bc4 and c48a. Based on the bi-grams, bigram-DCT image generator 206 computes a bi-gram frequency count. For example, the bigram-DCT image generator 206 determines how many of the corresponding bi-grams exist within the 16-bit hexadecimal vector.

The bi-gram image generator 210 generates a bi-gram image using the bi-gram frequency count. The bi-gram image has dimensions 256×256, where each pixel intensity value of the bi-gram image corresponds to a normalized frequency count of a particular bi-gram. The bi-gram image has a few parameters that are non-zero and many which are strictly zero.

The bigram-DCT image generator 206 computes a full frame discrete cosine transform (DCT) of the bi-gram image to generate a bigram-DCT image. The DCT transforms a signal or image from the spatial domain to the frequency domain. The DCT is a transformation that expresses a finite sequence of data points (e.g., a vector) in terms of a sum of cosine functions oscillating at different frequencies. A two-dimensional (2D) DCT is used to visualize the data represented within the bi-gram image. The bigram-DCT image generator 206 may apply a two-dimensional DCT on the bi-gram image to generate the bigram-DCT image. In some examples, the resulting bigram-DCT image is a 256×256 image with distinctive textured patterns.

The image classification neural network 204 determines whether the computer file is malware. The image classification neural network 204 may be a "shallow" convolutional neural network (CNN). In some examples, the image classification neural network 204 is a shallow CNN with three convolutional layers and two fully connected layers. In some examples, the image classification neural network 204 may be a "deep" neural network that is pre-trained on one or more image databases (e.g., ResNet-18/ResNet-50).

The image classification neural network 204 receives as input: the bigram-DCT image generated by the bigram-DCT image generator 206 and the byteplot image generated by the byteplot image generator 202. Specifically, the bigram-DCT image and byteplot image are concatenated and are run through the image classification neural network 204. The image classification neural network 204 generates a determination of whether the corresponding computer file is malware or benign.

In some examples, the image classification neural network 204 receives as input: the bigram-DCT image generated by the bigram-DCT image generator 206, the byteplot image generated by the byteplot image generator 202 and the bi-gram image generated by the bi-gram image generator 210.

In some examples the image classification neural network 204 computes image features on the input images. For example, the image classification neural network 204 computes GIST features on the input images. It is to be understood that the image classification neural network 204 may compute any other image features (or image descriptors) on the input images. These features are computed by convolution with an image at different scales and orientations.

In some examples, the malware visualization system 118 determines a joint feature metric to combine different image features. The joint feature metric includes a joint feature score which is based on the error analysis of different features. For example, if a dataset has 100 test samples and feature A mis-classifies 10 test samples and feature B mis-classifies 20 test samples, an ideal case for features A and B to be jointly rewarding is when the overlap between the mis-classified samples is zero. For example, the ideal case is for feature B to correctly classify the 10 samples that were mis-classified by feature A, and feature A can correctly classify the 20 samples that were mis-classified by feature B. An error-analysis matrix can be defined as follows: element (i,j) represents the number of samples classified correctly by the feature representing the $j^{th}$ column and mis-classified by the feature representing the $i^{th}$ row. Using the numbers given in the example above, the error-analysis matrix, $EA_I$ would be:

$$EA_I = \begin{pmatrix} 0 & 10 \\ 20 & 0 \end{pmatrix}$$

In another instance, feature B may correctly classify 5 out of 10 test samples that were mis-classified by feature A, and feature A correctly classifies 15 out of 20 samples that were mis-classified by feature B. In this case, the error-analysis matrix, $EA_R$ would be:

$$EA_R \begin{pmatrix} 0 & 5 \\ 15 & 0 \end{pmatrix}$$

The row-normalized matrices would then be:

$$\hat{EA}_I = \begin{pmatrix} 0 & 10/10 \\ 20/20 & 0 \end{pmatrix} = \begin{pmatrix} 0 & 1 \\ 1 & 0 \end{pmatrix}$$

$$\hat{EA}_R = \begin{pmatrix} 0 & 5/10 \\ 15/20 & 0 \end{pmatrix} = \begin{pmatrix} 0 & 0.5 \\ 0.75 & 0 \end{pmatrix}$$

The closeness between $\hat{EA}_I$ and $\hat{EA}_R$ is defined as the measure to quantify combining features A and B. This closeness is measured by a matrix $L_2$-norm. The matrix $L_2$-norm is unique as the norm of the different matrix can never exceed the value 2. Therefore, this metric falls within the range [0.2]. A value of 0 demonstrates the usefulness of the combination of features. A joint feature score which quantifies the combination of features can be defined as follows:

$$JFS = \frac{2 - \|\hat{EA}_I - \hat{EA}_R\|_2}{2}$$

For example, based on the examples referring to $EA_I$ and $EA_R$ above, the final confidence score can be defined as:

$$JFS_{AB} = \frac{2 - \left\|\begin{pmatrix} 0 & 0.5 \\ 0.25 & 0 \end{pmatrix}\right\|_2}{2} = \frac{1.5}{2} = 0.75$$

Based on the $JFS_{AB}$ calculated above, features A and B can be combined to give better ensemble feature representation for classification with a confidence score of 0.75. The $JFS_{AB}$ can also indicate that the maximum possible error reduction of the ensemble model (using features A in B) in terms of accurate is 75% compared to the worse performing feature (in this case, feature B) model. For example, the ensemble model will have an estimated classification accuracy of 95% (80+((0.75*20)) compared to 80% obtained using the feature B model.

The joint feature metric can also be computed for more than two features, where the error-analysis matrix will be a square matrix and the number of rows or columns are greater than two. In such cases, the joint feature measure between two or more features can be computed by extracting the corresponding rows and columns of the error-analysis matrix and then computing the JFS value for those features.

The malware visualization system 118 may use the joint feature metric to determine which features would provide the image classification neural network 204 with accurate classification results.

After concatenating the image features, the image classification neural network 204 generates a classification of the computer file. In some examples, the image classification neural network 204 uses k-Nearest Neighbors or Random Forest classifiers to classify the computer file.

In some examples, a user may upload the computer file via a network 102 using the UI module 208. The UI module 208 may cause presentation of the generated first image and the second image on a graphical user interface. The UI module 208 may include selectable user interface elements (e.g., buttons, navigational bars, drop-down menus and the like). The UI module 208 may further cause presentation of the bi-gram image generated by the bi-gram image generator 210 (e.g., the third image). A user of the client device may use the UI module 208 to analyze the generated images (e.g., the first image, the second image, and the third image). For example, the user may use the selectable user interface elements to annotate or markup portions of the generated images. In some examples, the UI module 208 causes presentation of the generated classification of the computer file. For example, if the malware visualization system 118 determines that computer file is malware, the UI module 208 may cause presentation of a notification that alerts the user to the contents of the computer file.

Figure 3:
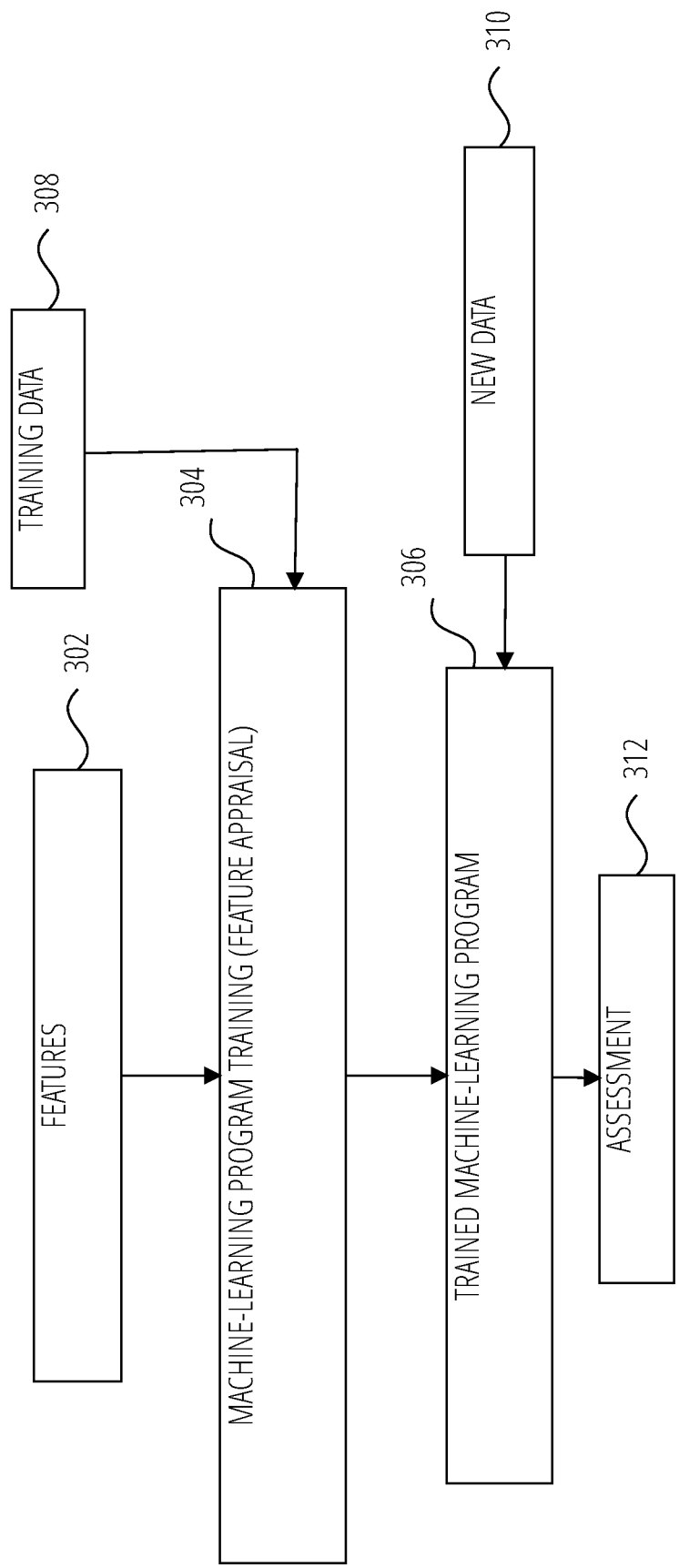
FIG. 3 illustrates the training and use of a machine-learning program, according to some example embodiments.

FIG. 3 illustrates the training and use of a machine-learning program, according to some example embodiments. In some example embodiments, machine-learning programs (MLPs), also referred to as machine-learning algorithms or tools, are utilized to perform operations associated with malware classification. Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 308 in order to make data-driven predictions or decisions expressed as outputs or assessment 312. Although example embodiments are presented with respect to a few machine-learning tools, the principles presented herein may be applied to other machine-learning tools.

In some example embodiments, different machine learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). In some embodiments, example machine-learning algorithms provide a prediction probability to classify an image as digitally manipulated or not. The machine-learning algorithms utilize the training data 308 to find correlations among identified features 302 that affect the outcome.

The machine-learning algorithms utilize features 302 for analyzing the data to generate an assessment 312. The features 302 are an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs. In one example embodiment, the features 302 may be of different types. For example, the features 302 may be features of the one or more input images: bi-gram image, byteplot image or bigram-DCT image.

The machine-learning algorithms utilize the training data 308 to find correlations among the identified features 302 that affect the outcome or assessment 312. In some example embodiments, the training data 308 includes labeled data, which is known data for one or more identified features 302 and one or more outcomes, such as detecting malware.

With the training data 308 and the identified features 302, the machine learning tool is trained (304). The machine-learning tool appraises the value of the features 302 as they correlate to the training data 308. The result of the training is the trained machine-learning program 306.

When the trained machine-learning program 306 is used to perform an assessment, new data 310 is provided as an input to the trained machine-learning program 306, and the trained machine-learning program 306 generates the assessment 312 as output. For example, when the input images (e.g., byteplot image and bigram-DCT image) are received, the machine-learning program utilizes features of the images to determine if the computer file is malware or not. Further details regarding the trained machine-learning program 306 are described below in relation to FIG. 4.

Figure 4:
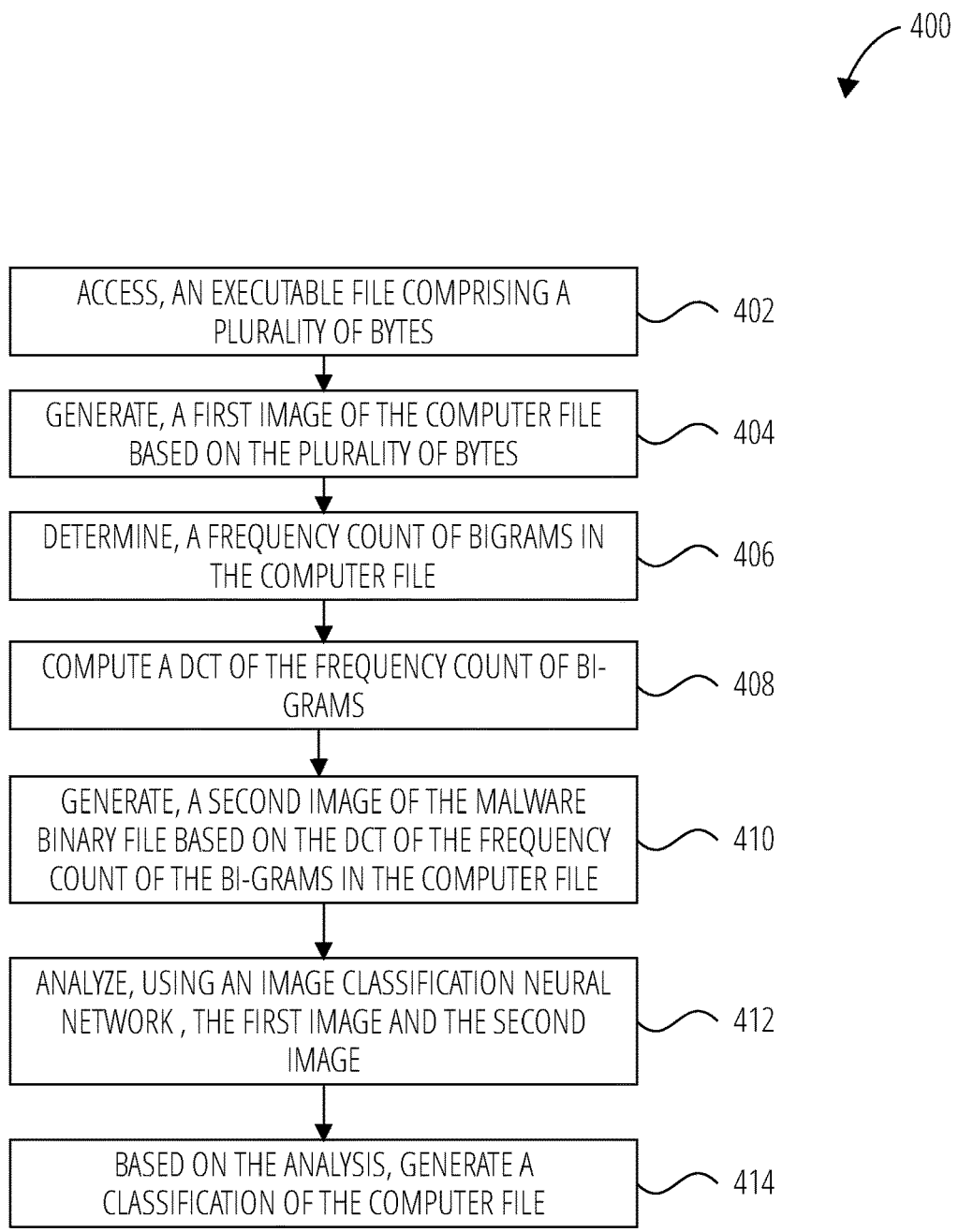
FIG. 4 is an example method for detecting malware, according to some example embodiments.

FIG. 4 is an example method for detecting malware, according to some example embodiments. The method 400 can be performed by the malware visualization system 118 in FIG. 1. In one embodiment, a processor (or circuitry dedicated to performing instructed tasks) included in the malware visualization system 118 performs the method 400 or causes the malware visualization system 118 to perform the method 400.

At operation 402, the malware visualization system 118 accesses, a computer file comprising a plurality of bytes. The computer file may be an executable file, or a data file as described above. At operation 404, the malware visualization system 118 generates, a first image of the computer file based on the plurality of bytes. For example, the first image may be a byteplot image generated by the byteplot image generator 202.

At operation 406, the malware visualization system 118 determines, a frequency count of bigrams in the computer file. At operation 408, the malware visualization system 118 computes a DCT of the frequency count of bigrams in the computer file. At operation 410, the malware visualization system 118 generates, a second image of the malware binary file based on the DCT of the frequency count of the bi-grams in the computer file. For example, the second image may be the bigram-DCT image generated by the bigram-DCT image generator 206.

At operation 412, the malware visualization system 118 analyzes, using an image classification neural network, the first image and the second image. The image classification neural network may be the image classification neural network 204. At operation 414, the malware visualization system 118 based on the analysis, generates a classification of the computer file. In some examples, the generated classification is stored in a database (e.g., database 120).

In some examples, the malware visualization system 118 may further analyze the bi-gram image generated by the bi-gram image generator 210 at operation 412.

Figure 5:
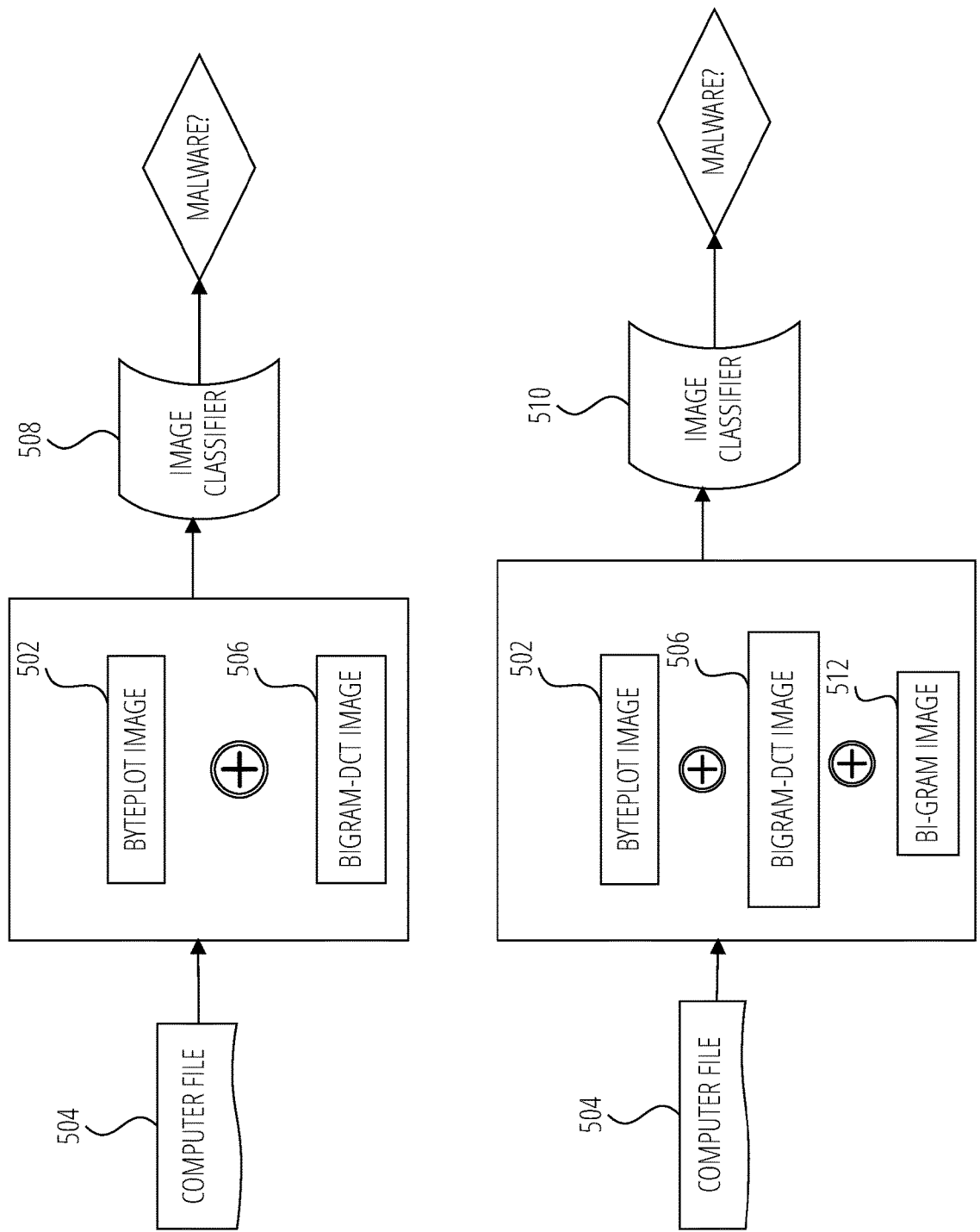
FIG. 5 is a diagram of the malware visualization system 118, according to example embodiments.

FIG. 5 is a diagram of the malware visualization system 118, according to example embodiments. The malware visualization system 118 access the computer file 504 and generates a byteplot image 502 and bigram-DCT image 506 based on the computer file 504. In some examples, the malware visualization system 118 further generates a bi-gram image 512. The features of the byteplot image 502, bigram-DCT image 506 and optionally, the bi-gram image 512 are concatenated and input into the image classifier 508, 510. In some examples the image classifiers 508, 510 are shallow CNNs. In some examples the image classifiers 508, 510 are deep neural network. In some examples, the image classifier 508 is a shallow CNN that has two input channels and the image classifier 510 is a deep neural network with three input channels. The image classifiers 508, 510 subsequently generate a classification of whether the computer file 504 is malware, benign or unknown.

Figure 6:
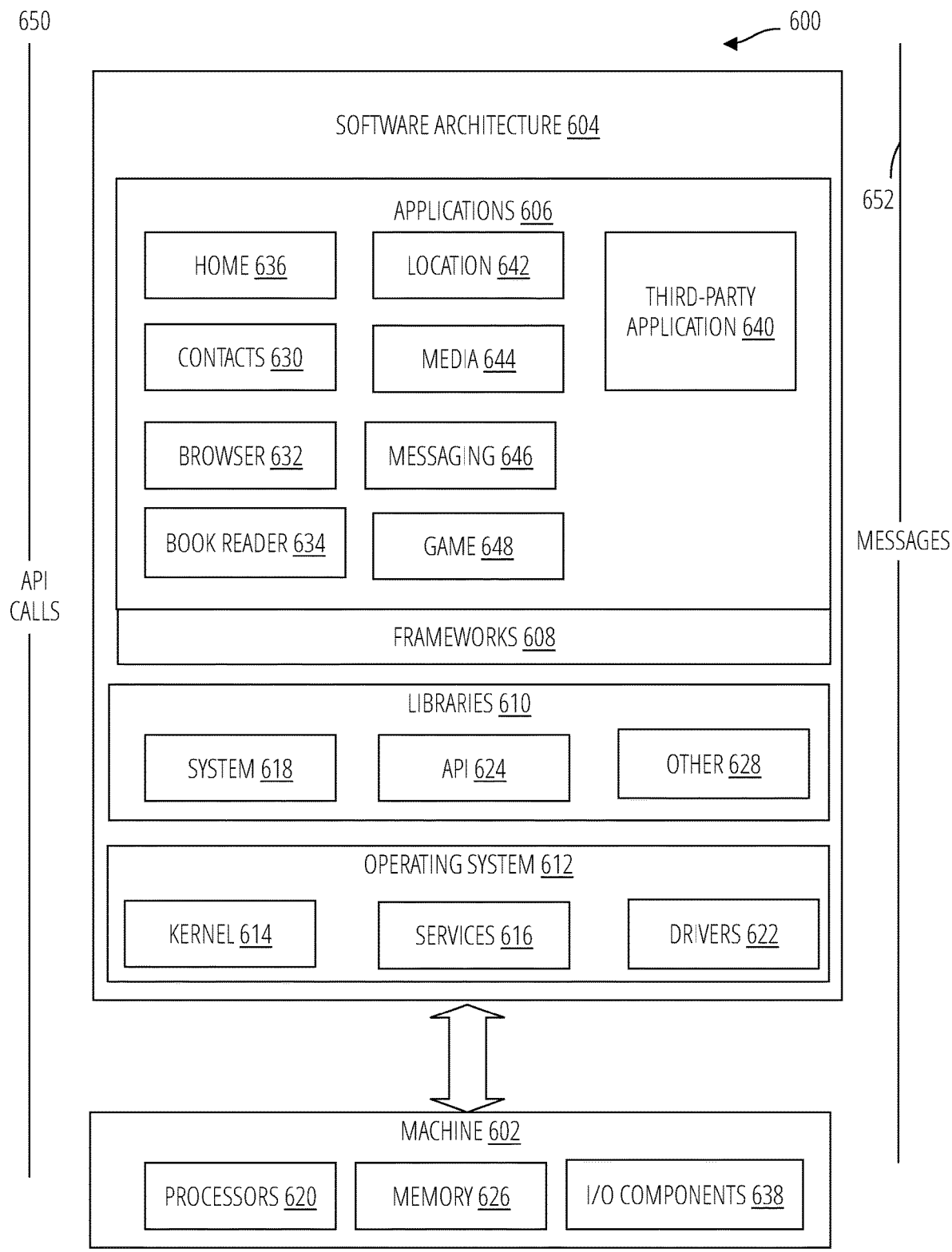
FIG. 6 is a block diagram 600 illustrating a software architecture, according to example embodiments.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionality. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 610 provide a low-level common infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a high-level common infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example embodiment, the applications 606 may include a home application 636, a contacts application 630, a browser application 632, a book reader application 634, a location application 642, a media application 644, a messaging application 646, a game application 648, and a broad assortment of other applications such as a third-party application 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party application 640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 640 can invoke the API calls 650 provided by the operating system 612 to facilitate functionality described herein.

Figure 7:
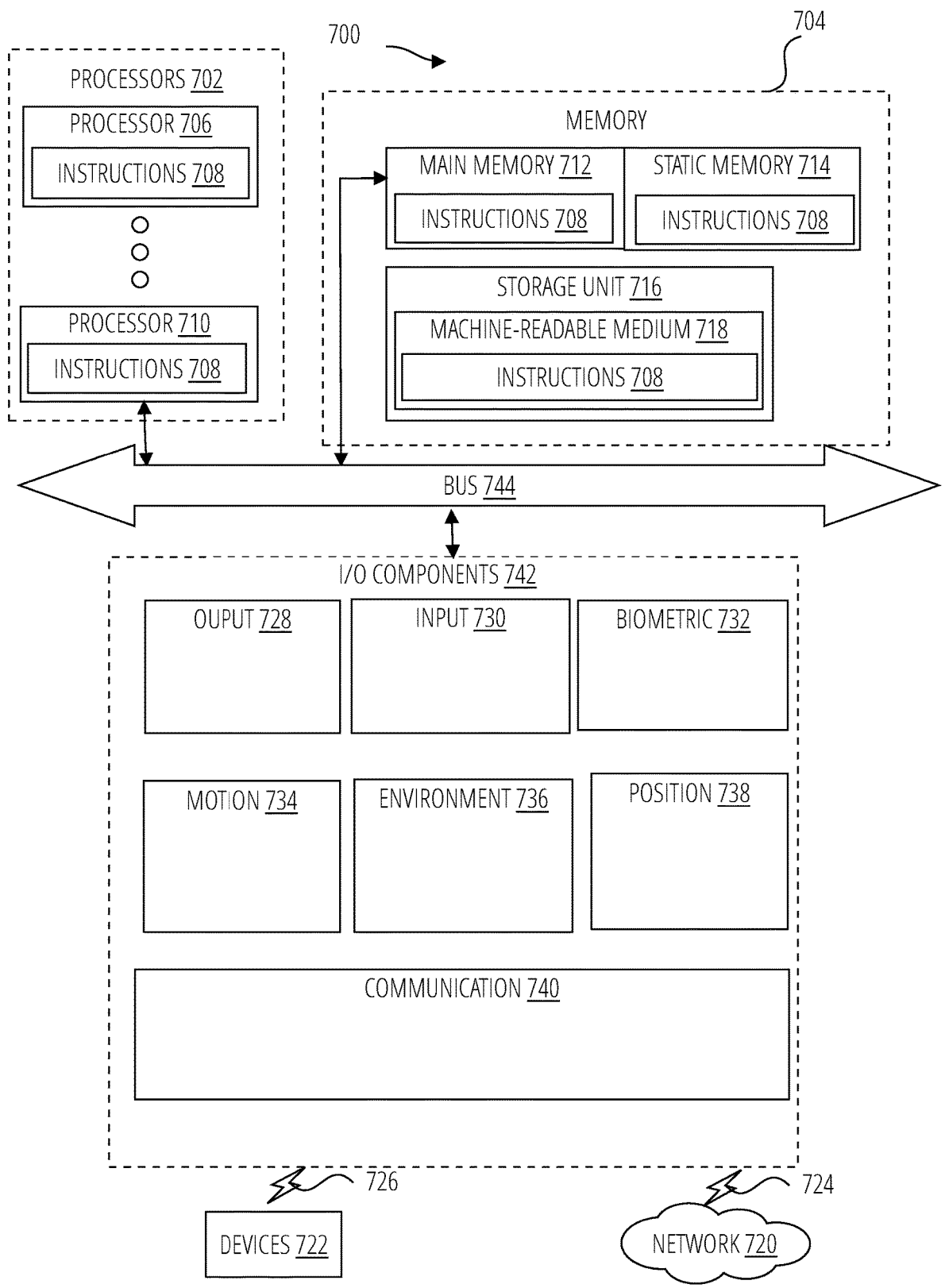
FIG. 7 is a diagrammatic representation of the machine within which instructions (e.g., software, a program, an application, an applet, an app, or other executable code) for causing the machine to perform any one or more of the methodologies discussed herein may be executed, according to example embodiments.

FIG. 7 is a diagrammatic representation of the machine 700 within which instructions 708 (e.g., software, a program, an application, an applet, an app, or other executable code) for causing the machine 700 to perform any one or more of the methodologies discussed herein may be executed. For example, the instructions 708 may cause the machine 700 to execute any one or more of the methods described herein. The instructions 708 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein.

The machine 700 may include processors 702, memory 704, and I/O components 742, which may be configured to communicate with each other via a bus 744. In an example embodiment, the processors 702 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 706 and a processor 710 that execute the instructions 708. The term "processor" is intended to include multi-core processors that may comprise two or more independent processors (sometimes referred to as "cores") that may execute instructions contemporaneously. Although FIG. 7 shows multiple processors 702, the machine 700 may include a single processor with a single core, a single processor with multiple cores (e.g., a multi-core processor), multiple processors with a single core, multiple processors with multiples cores, or any combination thereof.

The memory 704 includes a main memory 712, a static memory 714, and a storage unit 716, both accessible to the processors 702 via the bus 744. The main memory 704, the static memory 714, and storage unit 716 store the instructions 708 embodying any one or more of the methodologies or functions described herein. The instructions 708 may also reside, completely or partially, within the main memory 712, within the static memory 714, within machine-readable medium 718 within the storage unit 716, within at least one of the processors 702 (e.g., within the processor's cache memory), or any suitable combination thereof, during execution thereof by the machine 700.

The I/O components 742 may include a wide variety of components to receive input, provide output, produce output, transmit information, exchange information, capture measurements, and so on. The specific I/O components 742 that are included in a particular machine will depend on the type of machine. For example, portable machines such as mobile phones may include a touch input device or other such input mechanisms, while a headless server machine will likely not include such a touch input device. It will be appreciated that the I/O components 742 may include many other components that are not shown in FIG. 7. In various example embodiments, the I/O components 742 may include output components 728 and input components 730. The output components 728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 742 may include biometric components 732, motion components 734, environmental components 736, or position components 738, among a wide array of other components. For example, the biometric components 732 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 include acceleration sensor components (e.g., accelerometer), gravitation sensor components, rotation sensor components (e.g., gyroscope), and so forth. The environmental components 736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 742 further include communication components 740 operable to couple the machine 700 to a network 720 or devices 722 via a coupling 724 and a coupling 726, respectively. For example, the communication components 740 may include a network interface component or another suitable device to interface with the network 720. In further examples, the communication components 740 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 722 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geolocation, location via Wi-Fi® signal triangulation, location via detecting an NFC beacon signal that may indicate a particular location, and so forth.

The various memories (e.g., memory 704, main memory 712, static memory 714, and/or memory of the processors 702) and/or storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed embodiments.

The instructions 708 may be transmitted or received over the network 720, using a transmission medium, via a network interface device (e.g., a network interface component included in the communication components 740) and using any one of a number of well-known transfer protocols (e.g., hypertext transfer protocol (HTTP)). Similarly, the instructions 708 may be transmitted or received using a transmission medium via the coupling 726 (e.g., a peer-to-peer coupling) to the devices 722.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
accessing, using a hardware processor, a computer file comprising a plurality of bytes;
generating a first image of the computer file based on the plurality of bytes;
determining a frequency count of bigrams in the computer file;
computing a discrete cosine transform (DCT) of the frequency count of bi-grams;
generating a second image of the computer file based on the DCT of the frequency count of the bi-grams;
analyzing, by an image classification neural network, the first image and the second image, wherein the analyzing comprises:
determining a joint feature metric based on a first set of image features computed from the first image and a second set of image features computed from the second image; and
computing a joint feature score for the joint feature metric based on a matrix $L_2$-norm of an error-analysis matrix for the first set of image features and the second set of image features; and
generating a classification of the computer file based on the analyzing the first image and the second image.

2. The method of claim 1, further comprising:
storing the generated classification of the computer file in a database.

3. The method of claim 1, wherein the first image is a byteplot image of the computer file.

4. The method of claim 1, wherein the image classification neural network comprises a convolutional neural network.

5. The method of claim 1, wherein the analyzing the first image and the second image further comprises:
computing, using the image classification neural network, the first set of image features from the first image;
computing, using the image classification network, the second set of image features from the second image; and
concatenating the first set of image features and the second set of image features.

6. The method of claim 1, wherein the analyzing the first image and the second image further comprises:
concatenating the first set of image features and the second set of image features based on the joint feature metric.

7. The method of claim 1, wherein the analyzing the first image and the second image further comprises:
generating the error-analysis matrix for the first set of image features and the second set of image features; and
determining the matrix $L_2$-norm of the error-analysis matrix.

8. The method of claim 1, wherein the classification of the computer file indicates whether the computer file is malware.

9. The method of claim 1, wherein the image classification neural network further analyzes a third image that comprises a representation of the frequency count of bi-grams.

10. The method of claim 1, further comprising:
causing display of the first image and the second image on a graphical user interface of a client device; and
causing display of the classification of the computer file on the graphical user interface of the client device.

11. A system comprising:
a processor; and
a memory storing instructions that, when executed by the processor, configure the system to perform operations comprising:
accessing a computer file comprising a plurality of bytes;
generating a first image of the computer file based on the plurality of bytes;
determining a frequency count of bigrams in the computer file;

computing a discrete cosine transform (DCT) of the frequency count of bi-grams;
generating a second image of the computer file based on the DCT of the frequency count of the bi-grams;
analyzing, by an image classification neural network, the first image and the second image, wherein the analyzing comprises:
determining a joint feature metric based on a first set of image features computed from the first image and a second set of image features computed from the second image; and
computing a joint feature score for the joint feature metric based on a matrix $L_2$-norm of an error-analysis matrix for the first set of image features and the second set of image features; and
generating a classification of the computer file based on the analyzing the first image and the second image.

12. The system of claim 11, wherein the operations further comprise:
storing the generated classification of the computer file in a database.

13. The system of claim 11, wherein the first image is a byteplot image of the computer file.

14. The system of claim 11, wherein the image classification neural network comprises a convolutional neural network.

15. The system of claim 11, wherein the analyzing the first image and the second image further comprises:
computing, using the image classification neural network, the first set of image features from the first image;
computing, using the image classification network, the second set of image features from the second image; and
concatenating the first set of image features and the second set of image features.

16. The system of claim 11, wherein the analyzing the first image and the second image further comprises:
concatenating the first set of image features and the second set of image features based on the joint feature metric.

17. The system of claim 11, wherein the analyzing the first image and the second image further comprises:
generating the error-analysis matrix for the first set of image features and the second set of image features; and
determining the matrix $L_2$-norm of the error-analysis matrix.

18. The system of claim 11, wherein the classification of the computer file indicates whether the computer file is malware.

19. The system of claim 11, wherein the image classification neural network further analyzes a third image that comprises a representation of the frequency count of bi-grams.

20. A non-transitory computer-readable storage medium including instructions that when executed by a computer, cause the computer to perform operations comprising:
accessing a computer file comprising a plurality of bytes;
generating a first image of the computer file based on the plurality of bytes;
determining a frequency count of bigrams in the computer file;
computing a discrete cosine transform (DCT) of the frequency count of bi-grams;
generating a second image of the computer file based on the DCT of the frequency count of the bi-grams;
analyzing, by an image classification neural network, the first image and the second image, wherein the analyzing comprises:
determining a joint feature metric based on a first set of image features computed from the first image and a second set of image features computed from the second image; and
computing a joint feature score for the joint feature metric based on a matrix $L_2$-norm of an error-analysis matrix for the first set of image features and the second set of image features; and
generating a classification of the computer file based on the analyzing the first image and the second image.

* * * * *